Patented July 28, 1953

2,647,147

UNITED STATES PATENT OFFICE 2,647,147

PROCESS FOR PREPARING 2,3-BUTA-
DIENYLAMINES

Vaughn A. Engelhardt, Claymont, Del., assignor to E. I. du Pont de Nemours and Company, Wilmington, Del., a corporation of Delaware No Drawing. Application December 13, 1950,
Serial No. 200,695

10 Claims. (Cl. 260—583)

This invention relates to a new process for preparing 2,3-butadienylamines.

Butadienylamines have been prepared (see U. S. Patents 2,073,363 and 2,136,177) by the condensation of ammonia and amino hydrogen-containing amines with isochloroprene and (see French Patent 906,118) by the condensation, preferably in the presence of metallic catalysts, of ammonia or a primary or secondary amine with an acetylenic compound wherein the acetylenic group is in conjugation with another unsaturated carbon to carbon linkage, e. g., monovinylacetylene. However, both processes have disadvantages. Thus, the condensation of vinylacetylene with the amino compound while using probably the cheapest and most readily available active actylenic unsaturate, i. e., monovinylacetylene (ex acetylene) gives an excessively high cost butadienylamine because of the low yields obtained in the process. Butadienylamines from isochloroprene and amino compounds are undesirably high in cost because of the introduction of an intermediate stage between the cheap and readily available ultimate raw material and the end product, i. e., the conversion of the monovinylacetylene to isochloroprene.

This invention has as an object a readily operable, direct, high yield route to the 2,3-butadienylamines. A further object is a provision of a process not dependent upon the use of catalysts. Another object is the preparation of 2-butynylamino compounds. Other objects will appear hereinafter.

These objects are accomplished by the process wherein monovinylacetylene is condensed in an aqueous system in a closed reactor at autogenous pressure with a non-aromatic amino hydrogen-containing compound of no more than six carbons per amino nitrogen whose only active hydrogens are amino hydrogens and which is soluble to the extent of at least 3.5% in water at 25° C. The reaction is preferably carried out in the range from 50° C. to that temperature at which decomposition and polymerization of the monovinylacetylene becomes excessive, usually in the neighborhood of 200° C. Essentially equivalent molar proportions of the requisite amino hydrogen-containing amine and monovinylacetylene are normally used. When excesses of the amino hydrogen-containing amine, or appreciable proportions of strong, organic soluble bases which are non-water sensitive and free of active hydrogens, e. g., triethylamine, are used, the amine adducts are still obtained in improved yields, but appreciable proportions of the 2,3-butadienylamines undergo rearrangement to the corresponding internal acetylenic amines, i. e., the 2-butynylamines. Other organic bases have also been found to effect this rearrangement which also forms a part of this invention.

The proportions of the 2-butynylamines formed either in the condensation reaction or by the basic rearrangement of the 2,3-butadienylamines after isolation vary with the basicity of the the reaction conditions. For instance, when the condensation reaction is carried out in the presence of a 100% molar excess of the addend amine, specifically the relatively strongly basic dimethylamine, approximately 50% of the amine product obtained is the 2-butynylamine, i. e., the rearranged product. As the excess of the addend amine used decreases, e. g., to 25% on a molar basis, or increases, e. g., to 300% on a molar basis, the proportion of the amine product, which is in the rearranged form, i. e., the 2-butynylamines, correspondingly decreases, e. g., to about 10%, and increases, e. g., to about 100%. A similar dependence exists between the proportion of the rearranged amine obtained and the amount present of the previously mentioned organic-soluble, strong, non-active hydrogen-containing bases. e. g., triethylamine. This same dependence also exists in those instances wherein the rearrangements is carried out separately after isolation of the 2,3-butadienylamine.

When strong, water-sensitive, non-active hydrogen-containing organic bases, e. g., sodium methoxide, are used with the previously formed and isolated 2,3-butadienylamines, appreciably higher proportions of the 2-butynyl, i. e., rearranged, amines are obtained. Specifically, when the 2,3-butadienylamines are treated with equimolar proportions of these strong organic bases, the rearranged amines are obtained in amounts ranging from 75% to essentially 100% of theory, depending upon the difficulties encountered in isolation and purification. As the relative amount of the strong, water-sensitive, organic bases used decreases, the degree of completion of the rearrangement reaction also decreases but not as rapidly as previously described in the case of the water-insensitive, strong, organic bases. For instance, when only 25% on a molar basis of the strong, water-sensitive organic bases is used, the product obtained in major proportion is the rearranged, i. e., 2-butynylamine.

In the case of the primary amines when excesses of monovinylacetylene are used, the amine adducts are still obtained in improved yields but appreciable proportions of the 2,3-butadienylamines undergo further reaction with the monovinylacetylene to form the di(2,3-butadienyl)- amines. The proportions of the di(2,3-butadienyl) amines formed varies with the relative excess of monovinylacetylene used. For instance, as illustrated specifically in the second portion of Example II, when a 10% molar excess of monovinylacetylene is reacted with methylamine, approximately 70% of the amine product isolated is the di(2,3-butadienyl) amine. As greater excesses of monovinylacetylene are used, e. g., of the order of 25 to 50 mole per cent, the di(2,3-butadienyl)-amines are obtained in correspondingly increasing proportions, e. g., 75 to 90% of the amine products isolated. When large excesses of monovinylacetylene, e. g., of the order of 100% molar excess, are used, the amine product obtained is essentially all the di(2,3-butadienyl) amine.

It is interesting to note the profound effect on the nature of the products—obtained with the primary amines—exerted by relatively small excesses of monovinylacetylene. This is presumably due to the greater reactivity of secondary amines vs. primary amines with monovinylacetylene. Thus, the 2,3-butadienylamine formed in the first stages of the reaction tends to react more rapidly with the excess monovinylacetylene thereby forming proportionately greater quantities of the di(2,3-butadienyl) amine. It should be noted that since the starting amine is a primary amine that the di-substituted products referred to above are tertiary amines.

The amount of water needed is not critical to the improved process of this invention provided a minimum of at least 50% of the amount of water necessary to dissolve the amine reactant at room temperature is present. Obviously, large excesses can be used. However, from the cost standpoint and the relative convenience equipment-wise of carrying out the reactions, it is usually preferred not to use more than 300% water based on the amine. In the case of those amines which are gaseous under normal conditions, it is preferred to use the readily available 25% aqueous solutions.

The following examples in which parts are by weight are illustrative of the invention:

EXAMPLE I

A stainless steel, pressure resistant reaction vessel of internal capacity corresponding to 1,000 parts of water is evacuated and then charged with 540 parts of a 25% aqueous solution of dimethylamine. The still partially evacuated reactor is connected to a small cylindrical pressure vessel, with valves at both ends, containing 156 parts of monovinylacetylene and the latter is pressured into the reactor using nitrogen under a pressure of 200 lbs./sq. in. The reactor is then sealed and heated for ten hours at 100° C. At the end of this time, the bomb is allowed to cool to room temperature, bled to the atmosphere, opened, and the liquid reaction mixture removed. This reaction is repeated twice more under the same conditions, and the aqueous reaction products formed in the three runs are combined. This mixture is saturated with potassium carbonate and extracted with ether. The combined ether extracts are dried over potassium hydroxide and then over anhydrous magnesium sulfate. Ether is removed from the resulting dried solution and the product fractionated through a 12″ packed (glass helices) column. There is thus obtained 494 parts (56% yield) of N,N-dimethyl-2,3-butadienylamine as a clear liquid boiling at 57.5–59.5° C. under a pressure corresponding to 150 mm. of mercury and 106.5–107.0° C. under atmospheric pressure and exhibiting an $n_D^{25}$ of 1.4468.

Analysis

Calculated for $C_6H_{11}N$: C, 74.17%; H, 11.41%; N, 14.42%.
N. E. (neutral equivalent) 97.2 and an absorption of 0.0415 g. of hydrogen per gram.
Found: C, 74.52%; H, 11.45%; N, 13.98%.
N. E. 99.6 and an absorption of 0.0423 g. of hydrogen per gram.

The hydrogen absorption is the hydrogen absorbed on hydrogenation over ten per cent platinum oxide catalyst under a hydrogen pressure slightly in excess of one atmosphere.

A methiodide derivative of the amine, prepared by adding methyl iodide slowly with cooling to an absolute alcohol solution of the amine, is obtained as white crystals melting with slight decomposition at 193–194° C.

Analysis

Calculated for $C_7H_{14}NI$: C, 35.16%; H, 5.90%; N, 5.86%; I, 53.08%.
Found: C, 35.38%; H, 6.06%; N, 5.55%; I, 52.93%.

When 100 parts of anhydrous dimethylamine and 115 parts of monovinylacetylene are charged into the same vessel and in the same manner as described above and heated at 100° C. for ten hours under autogenous pressure and the product, isolated in the same manner as above, there is obtained only 3.9 parts (representing 1.8% conversion) of impure N,N-dimethyl-2,3-butadienylamine boiling at 41–43° C. under a pressure corresponding to 74 mm. of mercury and exhibiting an $n_D^{25}$ of 1.4441.

When 104 parts of monovinylacetylene and 720 parts of 25% aqueous dimethylamine (100% excess on a molar basis) are reacted at 100° C. for 20 hours and the product isolated, all in the same manner as described previously, there is obtained 78.8 parts of a mixture of N,N-dimethyl-2,3-butadienylamine and N,N-dimethyl-2-butynylamine as a clear, colorless liquid boiling at 107–113° C. under atmospheric pressure. Upon refractionation through a Podbielniak column, this mixture is indicated to contain approximately 50% of N,N-dimethyl-2-butynylamine boiling at 116.5–117.0° C. under atmospheric pressure. This purified material exhibits a $n_D^{25}=1.4333–1.4342$ and a Raman spectrum indicating the presence of only very slight traces of allene linkages, —C=C=C—, and strong indications of acetylenic linkages,

—C≡C—

Analysis

Calculated for $C_6H_{11}N$: N, 14.42%.
N. E. 97.2 and an absorption of 0.0415 g. of hydrogen per g.
Found: N, 13.86%.
N. E. 97.0 and an absorption of 0.0428 g. of hydrogen per g.

A solution of 50 parts of N,N-dimethyl-2,3-butadienylamine, prepared as described above, and 27.8 parts (an equimolar proportion) of sodium methoxide in about 77 parts of absolute methyl alcohol is charged into an evacuated, cooled bomb which is then pressured to 200 lbs./sq. in. per nitrogen and heated at 105° C. for eight hours. At the end of this time the bomb is allowed to cool, vented to the atmosphere, and the liquid product discharged. The solution is acidified with hydrochloric acid and the methyl alcohol removed under reduced pressure. The residue is cooled, made alkaline through the addition of aqueous 20% sodium hydroxide and extracted with ether. After drying over anhydrous magnesium sulfate, the ether is removed by distillation and the residual oil distilled under nitrogen at atmospheric pressure. There is thus obtained 37.7 parts (75% yield) of fairly pure N,N-di-methyl-2-butynylamine as a clear liquid boiling at 114.0–115.5° C. under atmospheric pressure and exhibiting a $n_D^{25} = 1.4330$. A sample of this product failed to react with potassium mercuric iodide reagent, thereby indicating an absence of a terminal acetylenic linkage [see Johnson and McEwen, J. Am. Chem. Soc. 48, 469 (1926)].

A sample of this product is refractionated through a micro-Podbielniak column. A heart cut from this fractionation (B. P. 117.0° C. under atmospheric pressure and $n_D^{25} = 1.4337$) exhibits the following:

*Analysis*

Calculated for $C_6H_{11}N$: C, 74.17%; H, 11.41%.
N. E. 97.2 and an absorption of 0.0415 g. of hydrogen per g.
Found: C, 74.22%; H, 11.57%.
N. E. 98.0 and an absorption of 0.0422 g. of hydrogen per g.

A methiodide derivative prepared from this material in the same manner as described previously is obtained in white crystals melting at 165–166° C.

*Analysis*

Calculated for $C_7H_{14}NI$: C, 35.16%; H, 5.90%.
Found: C, 34.89%; H, 6.00.

An authentic sample of N,N-dimethyl-2-butynylamine, prepared by the procedure of Parcell and Pollard, J. Am. Chem. Soc. 72, 2385 (1950) varying only in that dimethylamine is used instead of diethylamine, exhibits a B. P. of 115.5–116.0° C. under atmospheric pressure and $n_D^{25} = 1.4337$. A methiodide derivative prepared in the manner described previously is obtained as white crystals melting at 164–165° C. Similarly, the product rearranged, from N,N-dimethyl-2,3-butadienylamine whose preparation has been described in detail in two ways immediately above, exhibits a B. P. of 117.0° C., a $n_D^{25} = 1.4337$, and a M. P. of 165–166° C. for its methiodide derivative. Furthermore, the infrared spectra of the amines prepared by all three methods are identical and there is no obvious depression in the melting point when the methiodides are mixed. Thus, it becomes clear that the product obtained from the rearrangement of the 2,3-butadienylamines in the presence of molar quantities of organic bases are the corresponding 2-butynylamines. This rearrangement can be effected in situ by carrying out the initial condensation in the presence of appreciable excesses of the order of 25% or more on a molar basis of the condensing of the amino hydrogen-containing amines or can be effected separately after the initial 2,3-butadienylamine is isolated.

EXAMPLE II

In the manner described in Example I a mixture of 156 parts of monovinylacetylene and 232 parts of a 40% aqueous methylamine solution is charged into a similar reactor, heated at 100° C. for ten hours, and the aqueous reaction mixture thus obtained removed and purified. After fractionation of the oil remaining after removal of the ether, there is thus obtained 30.8 parts (13% yield) of N-methyl-2,3-butadienylamine as a clear, colorless liquid boiling at 59.0–59.5° C. at a pressure corresponding to 141 mm. of mercury and exhibiting an $n_D^{25}$ of 1.4616–1.4664. The product is refractionated and the center cut (B. P. 105.0–106.0° C. at atmospheric pressure) analyzed.

*Analysis*

Calculated for $C_5H_9N$: N, 16.85%.
N. E. 83.1 and an absorption of 0.0485 g. of hydrogen per gram.
Found: N, 16.55%.
N. E. 84.7 and an absorption of 0.0495 g. of hydrogen per gram.

A phenylthiourea (prepared according to procedure 20, page 179, Shriner and Fuson, "Identification of Organic Compounds," third edition, 1948, Wiley; by reaction of the amine product with phenylisothiocyanate) is obtained as white crystals melting at 62.0–63.5° C.

*Analysis*

Calculated for $C_{12}H_{14}N_2S$: C, 66.02%; H, 6.46%.
Found: C, 66.06%; H, 6.66%.

In a similar fashion varying only in that the pressure resistant reaction vessel is equipped with an efficient mechanical stirrer, a mixture of 1490 parts of a 25% aqueous methylamine solution and 686 parts of monovinylacetylene (10% molar excess based on the amine) is heated at 100° C. for 15 hours under a pressure of 200 lbs./sq. in. of nitrogen. The aqueous reaction mixture thus obtained is removed and worked up as described previously. The product thus obtained is fractionally distilled through a 3 inch Vigreux column and selected fractions from this distillation are then refractionated through a 12 inch column packed with glass helices. There is thus obtained 80.9 parts (8% yield based on methylamine) of N-methyl-2,3-butadienylamine as a clear, colorless liquid boiling at 105.0–107.5° C. at atmospheric pressure and 185.9 parts (20.9% yield based on monovinylacetylene) of N-methyl-di(2,3-butadienyl)amine as a clear, colorless liquid boiling at 70.0–71.0° C. under a pressure corresponding to 15 mm. of mercury and exhibiting a $n_D^{25}$ of 1.4988.

Analysis for the latter product, i. e., N-methyl-di(2,3-butadienyl)amine:

Calculated for $C_9H_{13}N$: C, 79.95%; H, 9.69%; N, 10.36%.
N. E. 135.2 and an absorption of 0.0596 g. of hydrogen per gram.
Found: C, 80.22%; H, 9.95%; N, 10.08%.
N. E. 134.5 and an absorption of 0.0644 g. of hydrogen per gram.

EXAMPLE III

A mixture of 141 parts of diethylamine, 260 parts of water and 100 parts of monovinylacetylene are charged into a stainless steel reaction vessel, heated at 100° C. for fifteen hours and the aqueous reaction product removed and purified—all in the same manner as described previously in Example I. Fractionation of the oily product remaining after removal of the ether by distillation yields about 57.5 parts of unreacted diethylamine and 29 parts (20% yield based on diethylamine) of N,N-diethyl-2,3-butadienylamine as a clear, colorless liquid boiling at 91.0 to 92.5° C. under a pressure corresponding to 147 mm. of mercury.

*Analysis*

Calculated for $C_8H_{15}N$: C, 76.73%; H, 12.08%; N, 11.19%.

N. E. 125.2 and an absorption of 0.0322 g. of hydrogen per gram.

Found: C, 76.66%; H, 12.15%; N, 10.81%.

N. E. 126.8 and an absorption of 0.0361 g. of hydrogen per gram.

EXAMPLE IV

In the same manner as described previously in Example I a mixture of 100 parts of monovinylacetylene, 168 parts of morpholine, and 260 parts of water is charged into a stainless steel reaction vessel, heated for ten hours at 100° C. and the aqueous reaction product removed and purified. Fractionation of the oily residue remaining after the ether is removed by distillation yields 72 parts (34% yield based on morpholine) of N-(2,3-butadienyl)morpholine as a clear, colorless liquid boiling at 70.5–71.5° C. under a pressure corresponding to 9 mm. of mercury and exhibiting an $n_D^{25}$ of 1.4917.

*Analysis*

Calculated for $C_8H_{13}NO$: C, 69.03%; H, 9.41%; N, 10.06%.

N. E. 139.2 and an absorption of 0.0290 g. of hydrogen per gram.

Found: C, 69.05%; H, 9.51%; N, 10.04%.

N. E. 141.0 and an absorption of 0.0300 g. of hydrogen per gram.

When 100 parts of monovinylacetylene and 100 parts of morpholine are charged into a pressure resistant reaction vessel of internal capacity corresponding to 500 parts of water in a manner as described previously in Example I and heated at 100° C. for ten hours under autogenous pressure and the product isolated in the same manner as previously described, there is obtained only 5.2 parts (representing a 1.9% conversion) of impure N-(2,3-butadienyl)morpholine boiling at 61–70° C. under a pressure corresponding to 7 mm. of mercury and exhibiting an $n_D^{25}$ of 1.4901.

As stated previously, the preparation of the 2,3-butadienylamines by the process of this invention can be carried out at temperatures ranging from 50 to 200° C. Because of the difficulties inherent in handling monovinylacetylene at high temperatures, temperatures in the range of 90 to 125° C. are preferred. The process of this invention can, of course, be carried out in a batch-wise, semi-continuous, or continuous manner.

The amines which can be condensed with monovinylacetylene by the process of this invention to prepare the corresponding 2,3-butadienylamines and/or 2-butynylamines are primary and secondary amines of not more than six carbons per amino nitrogen in which the only active hydrogen is the amino nitrogen which is bonded solely to non-aromatic, i. e., aliphatic, including cycloaliphatic, carbon. Examples of these amines include amino-hydrogen-containing amines such as: primary, saturated, aliphatic amines, e. g., methylamine, ethylamine, amylamine; primary, unsaturated, aliphatic amines, e. g., allylamine; secondary, saturated, aliphatic amines, e. g., dimethylamine, ethylpropylamine; secondary, unsaturated, aliphatic amines, e. g., N-propylallylamine; substituted primary aliphatic amines, e. g., 3-nitropropylamine, 4-ethoxybutylamine; substituted secondary aliphatic amines, e. g., N-methyl-3-nitropropylamine, N-ethyl-2-methoxyethylamine; primary cycloaliphatic amines, e. g., cyclohexylamine; substituted primary cycloaliphatic amines, e. g., 4-nitrocyclohexylamine; polyamines, e. g., ethylenediamine, hexamethylenediamine, N, N'-diethylethylenediamine, triethylenetetramine; non-aromatic, i. e., aliphatic, heterocyclic amines, e. g., piperidine, piperazine, 2,5-dimethylpiperazine, morpholine.

By "active hydrogen" is meant hydrogen capable of releasing methane when reacted with Zerewitinoff's reagent (methylmagnesium iodide). Particularly preferred because of the desirable properties of the 2,3-butadienylamines and 2-butynylamines therefrom prepared are the amino hydrogen-containing monoamines which, apart from the amino nitrogen and hydrogen thereupon, are solely hydrocarbon. The secondary aliphatic monoamines of this latter type are most outstanding in this process because of their greater reactivity.

The 2,3-butadienylamines and 2-butynylamines are of interest in such widely varied uses as pest control chemicals, corrosion inhibitors, and oxidation inhibitors for such readily oxidized substances as rubber and naturally occurring unsaturated fatty oils. These amines are also useful as intermediates in the synthesis of other organic compounds such as, dyestuffs, pharmaceutical chemicals and the like.

The process of the present invention is of advantage in the excellent yield obtained and this in a one step process. The improvement attained in this condensation reaction by carrying it out in the manner of the process of this invention, i. e., using water as a reaction medium, is completely unexpected and makes a considerable difference in the availability and cost of the butadienylamine products. Thus, as discussed in greater detail in the examples, the water reaction medium increases the yield of N,N-dimethyl-2,3-butadienylamine from very low levels, e. g., 1.3%, to as high as about 60% of the theory in ten hours at 100° C. In the case of the condensation with morpholine, the yield of the 2,3-butadienylamine product is increased from 1.9% to 32% of theory through use of the process of this invention. Such improvements, ranging in the order of magnitude from 1600 to almost 3000%, represent an outstanding contribution to the field and are of obvious commercial importance.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the process for the preparation of amines having on the amino nitrogen a four carbon aliphatic substituent of the class consisting of the 2,3-butadienyl and 3-butynyl substituents by reacting monovinylacetylene with a non-aromatic amine having hydrogen on amino nitrogen which hydrogen is the only active hydrogen, having not more than six carbons per amino nitrogen and having a solubility in water at 25° C. of at least 3.5%, the improvement wherein the amine is brought into contact with monovinylacetylene in an aqueous system.

2. A process for preparing a 2,3-butadienylamino compound wherein monovinylacetylene is reacted with a non-aromatic amine having amino hydrogen as the only active hydrogen, having not more than six carbons per amino nitrogen, and having a solubility in water at 25° C. of at least 3.5%, by bringing the two reactants in contact in an aqueous system at 50–200° C.

3. A process for preparing a 2,3-butadienylamino compound wherein monovinyleacetylene is reacted with a non-aromatic amine wholly hydrocarbon apart from amino nitrogen and hydrogen thereon, having not more than six carbons per nitrogen and having a solubility in water at 25° C. of at least 3.5%, by bringing the two reactants in contact in an aqueous system at autogenous pressure and at a temperature in the range 50-200° C.

4. A process for preparing a 2,3-butadienylamino compound wherein monovinylacetylene is reacted with a non-aromatic amine wholly saturated hydrocarbon apart from amino nitrogen and hydrogen thereon, having not more than six carbons per nitrogen and having a solubility in water at 25° C. of at least 3.5%, by bringing the two reactants in contact in an aqueous system at 50-200° C. at autogenous pressure.

5. A process for preparing a 2,3-butadienylamino compound wherein monovinylacetylene is reacted with a non-aromatic monoamine having amino hydrogen as the only active hydrogen and having not more than six carbons by bringing the two reactants in contact in an aqueous system at 50-200° C.

6. A process for preparing a 2,3-butadienylamino compound wherein monovinylacetylene is reacted with a secondary aliphatic monoamine having amino hydrogen as the only active hydrogen and having not more than six carbons by bringing the two reactants in contact in an aqueous liquid system at 50-200° C.

7. In a process for the preparation of amines having on the amino nitrogen a four carbon aliphatic substituent of the class consisting of the 2,3-butadienyl and the 3-butynl substituents by reacting monovinylacetylene with a non-aromatic amine having hydrogen on amino nitrogen, which hydrogen is the only active hydrogen, having not more than six carbons per amino nitrogen and having a solubility in water at 25° C. of at least 3.5%, the improvement wherein the amine is brought into contact, in an aqueous system at 50-200° C., with the monovinylacetylene, said system having a base content in at least 25% excess of that corresponding to one mole amine per mole of monovinylacetylene.

8. Process of claim 7 wherein a 2-butynylamine is isolated from the reaction mixture 9. A process for preparing a 2-butynylamino compound wherein monovinylacetylene is reacted with a non-aromatic amine having amino hydrogen as the only active hydrogen, having not more than six carbons per amino nitrogen and having a solubility in water at 25° C. of at least 3.5%, by bringing the two reactants in contact in an aqueous system at 50-200° C. further characterized in that 2,3-butadienylamino reaction product is rearranged to the 2-butynylamino compound by contact with a base.

10. Process of claim 9 wherein the rearrangement takes place in situ.

VAUGHN A. ENGELHARDT.

References Cited in the file of this patent

UNITED STATES PATENTS

| Number | Name | Date |
|---|---|---|
| 2,110,199 | Carothers | Mar. 8, 1938 |
| 2,273,141 | Reppe et al. | Feb. 17, 1942 |

FOREIGN PATENTS

| Number | Country | Date |
|---|---|---|
| 906,118 | France | Dec. 24, 1945 |